United States Patent
Nicholson et al.

(10) Patent No.: US 10,429,798 B2
(45) Date of Patent: Oct. 1, 2019

(54) GENERATING TIMER DATA

(71) Applicant: LENOVO (Singapore) PTE. LTD., New Tech Park (SG)

(72) Inventors: John Weldon Nicholson, Cary, NC (US); Ming Qian, Cary, NC (US); Jonathan Jen-Wei Yu, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 25 days.

(21) Appl. No.: 15/590,848

(22) Filed: May 9, 2017

(65) Prior Publication Data
US 2018/0329369 A1 Nov. 15, 2018

(51) Int. Cl.
*G04F 1/00* (2006.01)
*G06F 1/14* (2006.01)
*G06F 9/451* (2018.01)
*G06F 9/4401* (2018.01)

(52) U.S. Cl.
CPC ............... *G04F 1/005* (2013.01); *G06F 1/14* (2013.01); *G06F 9/4411* (2013.01); *G06F 9/451* (2018.02); *G06F 9/453* (2018.02)

(58) Field of Classification Search
CPC . G04F 1/005; G06F 9/451; G06F 1/14; G06F 9/4443; G06F 9/453; G06F 9/4411; G08B 21/24; G10L 15/26
See application file for complete search history.

(56) References Cited

U.S. PATENT DOCUMENTS

| | | | | |
|---|---|---|---|---|
| 5,799,178 A * | 8/1998 | Walker | ...................... | G06F 1/14 713/502 |
| 6,018,289 A * | 1/2000 | Sekura | .................. | A61J 7/0481 221/15 |
| 6,229,430 B1 * | 5/2001 | Smith Dewey | ...... | G04G 13/026 340/286.02 |
| 6,294,999 B1 * | 9/2001 | Yarin | .................... | A61J 7/0481 340/573.1 |
| 6,332,100 B1 * | 12/2001 | Sahai | .................... | A61J 7/0481 700/236 |
| 6,550,015 B1 * | 4/2003 | Craycraft | .................. | G06F 1/14 713/502 |
| 6,898,155 B1 * | 5/2005 | Norman | .................. | G04F 1/005 307/116 |
| 6,943,671 B2 * | 9/2005 | McGee | .................. | G08B 21/24 340/309.16 |
| 7,289,016 B2 * | 10/2007 | Luebke | .................. | G04F 1/005 340/309.16 |
| 7,330,101 B2 * | 2/2008 | Sekura | ................ | G06F 19/3456 340/309.4 |
| 8,306,931 B1 * | 11/2012 | Bowman | .............. | G06N 3/0454 706/20 |
| 2003/0123330 A1 * | 7/2003 | Carter | ..................... | G04F 1/005 368/109 |
| 2006/0271582 A1 * | 11/2006 | Collins | ............ | G06F 17/30477 |

(Continued)

*Primary Examiner* — Nay Tun
(74) *Attorney, Agent, or Firm* — Kunzler Bean & Adamson

(57) ABSTRACT

For generating timer data, a processor identifies a timer command from a command signal from an input device. The processor further identifies a timer interval and timer characteristics from the timer command. In addition, the processor generates timer data comprising a timer tag from the timer characteristics and the timer interval.

20 Claims, 14 Drawing Sheets

(56) References Cited

U.S. PATENT DOCUMENTS

| | | | |
|---|---|---|---|
| 2014/0266702 A1* | 9/2014 | Forster-Knight | H04W 4/90 340/539.13 |
| 2014/0347175 A1* | 11/2014 | Stein | A61J 7/0409 340/309.7 |
| 2017/0083667 A1* | 3/2017 | Darrah | G06F 19/322 |
| 2018/0232436 A1* | 8/2018 | Elson | G06F 17/30654 |

* cited by examiner

GENERATING TIMER DATA

FIELD

The subject matter disclosed herein relates to generating timer data.

BACKGROUND

Description of the Related Art

Users may set timers as reminders.

BRIEF SUMMARY

An apparatus for generating timer data is disclosed. The apparatus includes an input device, a processor, and a memory that stores code executable by the processor. The processor identifies a timer command from a command signal from the input device. The processor further identifies a timer interval and timer characteristics from the timer command. In addition, the processor generates timer data comprising a timer tag from the timer characteristics and the timer interval. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
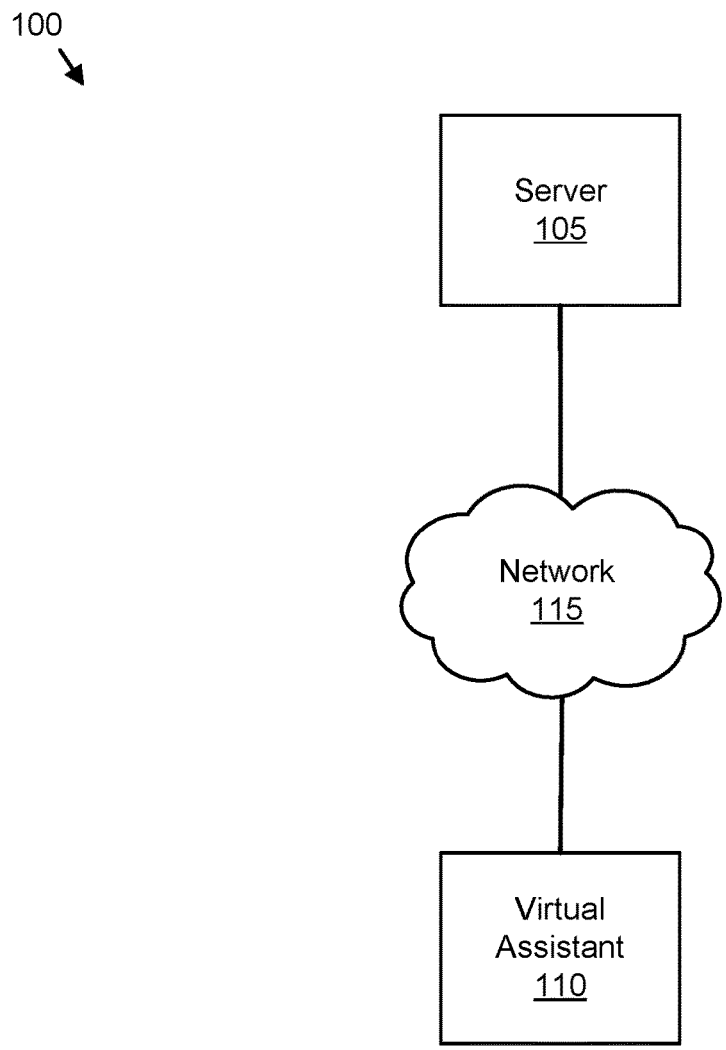
FIG. 1 is a schematic block diagram illustrating one embodiment of a timer system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a timer system 100. The system 100 may generate timer data and communicate a timer alert. In the depicted embodiment, the system 100 includes a server 105, a network 115, and a virtual assistant 110.

The network 115 may be the Internet, a mobile telephone network, a wide-area network, local area network, a Wi-Fi network, or combinations thereof. The virtual assistant 110 may interact with the user. The virtual assistant 110 may be an interactive electronic device. The server 105 may communicate with the virtual assistant 110 through the network 115.

The virtual assistant 110 may receive a timer command from the user. The virtual assistant 110 may further communicate the timer alert based on the timer command. Unfortunately, in the past, the user was limited in how a timer could be structured, queried, and modified. The embodiments described herein identify a timer command and identify a timer interval and timer characteristics from the timer command. The embodiments further generate timer data comprising a timer tag from the timer characteristics and the timer interval as will be described hereafter.

Figure 2A:
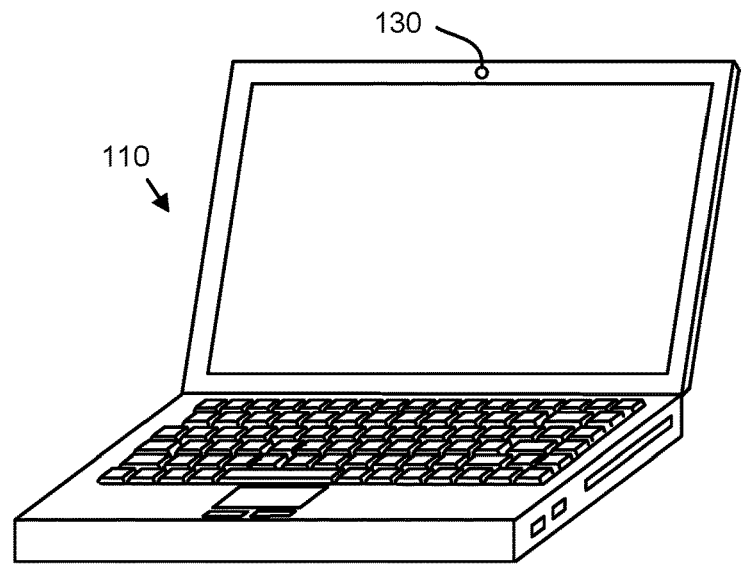
FIG. 2A is a perspective drawing illustrating one embodiment of a virtual assistant.

FIG. 2A is a perspective drawing illustrating one embodiment of the virtual assistant 110. In the depicted embodiment, the virtual assistant 110 is a laptop computer. The virtual assistant 110 includes an input device 130. In the depicted embodiment, the input device 130 is a microphone. Alternatively, the input device 130 may be a keyboard receiving text input, a touchscreen receiving touch input, an interface that receives a message from another device, and/or a network connection that receives a message.

Figure 2B:
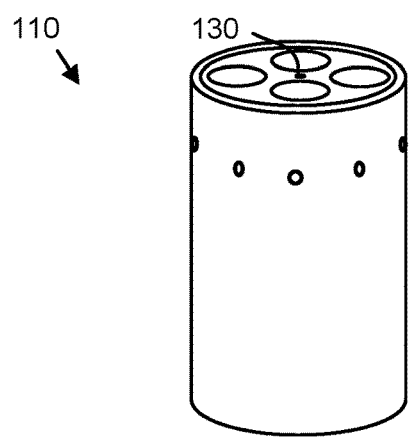
FIG. 2B is a perspective drawing illustrating one alternative embodiment of a virtual assistant.

FIG. 2B is a perspective drawing illustrating one alternative embodiment of the virtual assistant 110. In the depicted embodiment, the virtual assistant 110 is a smart appliance. The virtual assistant 110 includes an input device 130. In the depicted embodiment, the input device 130 is a microphone. Alternatively, the input device 130 may be a camera, a keyboard, a touchscreen, or the like.

Figure 2C:
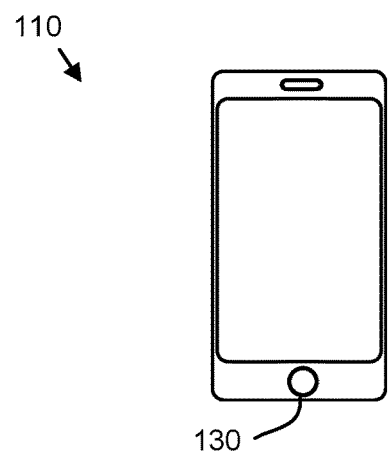
FIG. 2C is a front view drawing illustrating one alternate embodiment of a virtual assistant.

FIG. 2C is a front view drawing illustrating one alternate embodiment of the virtual assistant 110. In the depicted embodiment, the virtual assistant 110 is a mobile telephone. The virtual assistant 110 includes an input device 130. In the depicted embodiment, the input device 130 is a microphone. Alternatively, the input device 130 may be a camera, a keyboard, a touchscreen, or the like.

Figure 2D:
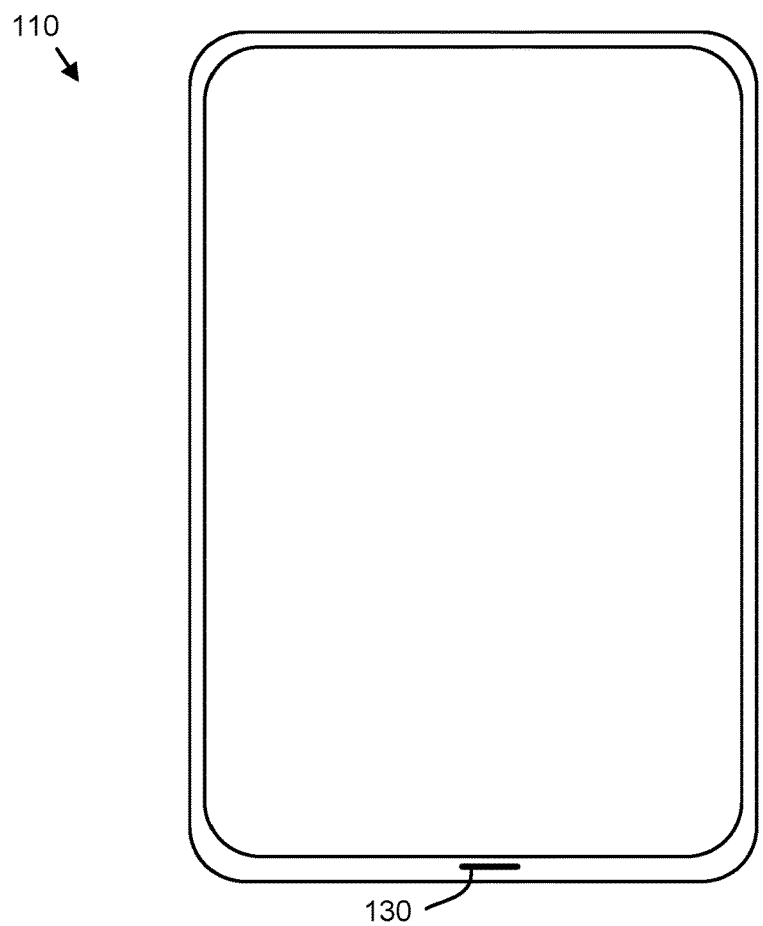
FIG. 2D is a front view drawing illustrating one alternative embodiment of a virtual insistent.

FIG. 2D is a front view drawing illustrating one alternative embodiment of a virtual insistent 110. In the depicted embodiment, the virtual assistant 110 is a tablet computer. The virtual assistant 110 includes an input device 130. In the depicted embodiment, the input device 130 is a microphone.

Figure 3A:
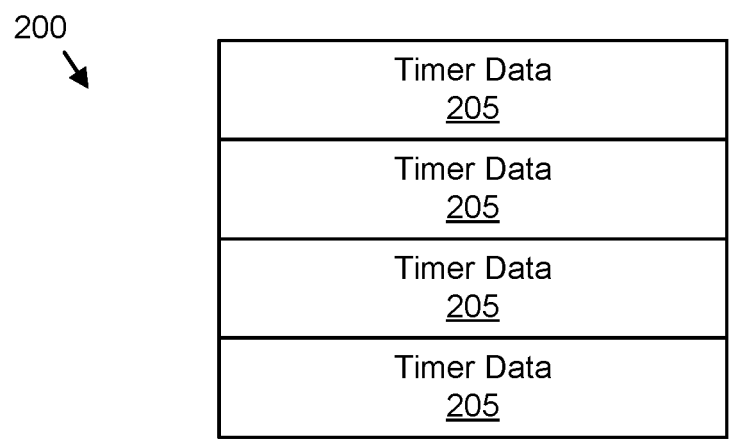
FIG. 3A is a schematic block diagram illustrating one embodiment of a timer database.

FIG. 3A is a schematic block diagram illustrating one embodiment of a timer database 200. The timer database 200 maybe organized as a data structure in a memory. The timer database 200 may reside in the virtual assistant 110, the server 105, or combinations thereof. The timer database 200 may include a plurality of timer data 205.

Figure 3B:
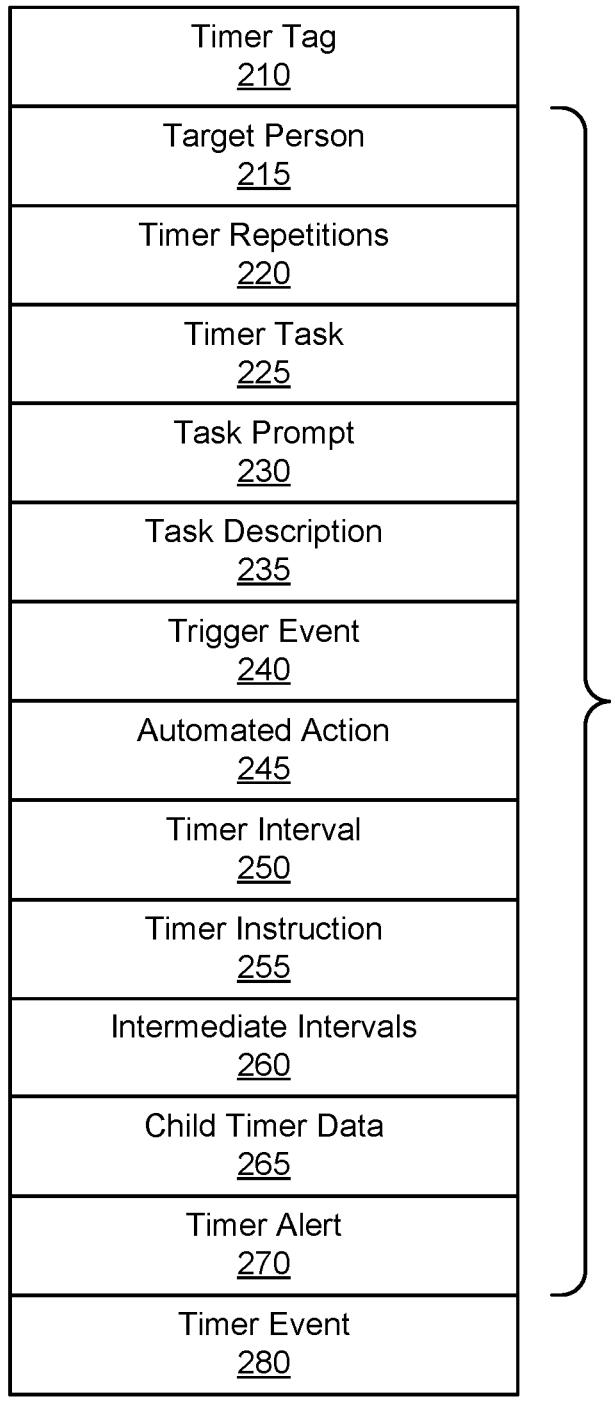
FIG. 3B is a schematic block diagram illustrating one embodiment of timer data.

FIG. 3B is a schematic block diagram illustrating one embodiment of the timer data 205. In one embodiment, the timer data 205 defines a unique timer that is created on the virtual assistant 110. In the depicted embodiment, the timer data 205 includes a timer tag 210, a target person 205, timer repetitions 220, a timer task 225, a task prompt 230, a task description 235, a trigger event 240, an automated action 245, a timer interval 250, a timer instruction 255, intermediate intervals 260, child timer data 265, a timer alert 270, and a timer event 280. The target person 205, timer repetitions 220, timer task 225, task prompt 230, task description 235, trigger event 240, automated action 245, timer interval 250, timer instruction 255, intermediate intervals 260, child timer data 265, and timer alert 270 may be embodied in timer characteristics 275.

The timer tag 210 may describe the timer of the timer data 205. The timer tag 210 may include a natural language description of the timer embodied in the timer data 205. In one embodiment, the timer tag 210 summarizes the timer characteristics 275.

The target person 215 may be a person for which the timer data 205 is created. The person may be the user creating the timer data 205. Alternatively, the target person 215 may be a third party. The target person 215 may include a location of the person. In addition, the target person 215 may include contact information for the person. In one embodiment, the target person 215 includes a voice print, image, and/or link to tracking data for the person.

The timer repetitions 220 may specify a number of times that the timer is executed. For example, the timer repetitions 220 may specify that the timer is repeated three times. The timer task 225 may specify a task associated with the timer. For example, the timer task 225 may be the task "check barbecue."

The task prompt 230 may be a phrase that is used to prompt a person to perform the timer task 225. For example, the task prompt 230 may be the phrase "please check the barbecue." The task prompt 230 may be generated from the timer tag 210. Alternatively, the timer tag 210 may be generated from the task prompt 230.

The task description 235 may describe the timer task 225. The task description 235 may be specified by the user. Alternatively, the task description 235 may be specified based on the timer tag 210 and/or the timer task 225.

The trigger event 240 may specify an event. The event may be an intermediate event that must occur before a timer event is satisfied. For example, the trigger event 240 may be "oven preheated to 400°."

The automated action 245 may be an action that is initiated by the virtual assistant 110 and/or the server 105. For example, the automated action 245 may be "turn off all lights in the house."

The time interval 250 may be one or more intervals of time. For example, the timer interval 250 may be 40 minutes. In addition, the timer interval 250 may be a specified time such 3:00 p.m.

The timer instruction 255 may include instructions that are communicated when a timer event is satisfied. For example, the timer instruction 255 may be "reserve a conference room." The timer instruction 255 may be generated from the timer tag 210. Alternatively, the timer tag 210 may be generated from the timer instruction 255.

The intermediate intervals 260 may specify one or more intervals of time that occur within the timer interval 250. For example, if the timer interval 250 is a two-hour timer interval, the intermediate intervals 260 may include four 30 minute time intervals.

The child timer data 265 may specify timer data 205 for a child timer of the timer. For example, the child timer data 265 may specify a trigger event 240 of an outside temperature of 20° C. The satisfaction of the child timer data 265 may be used to determine if the trigger event 240 of the timer data 205 is satisfied.

The timer alert 270 may be communicated to one or more persons when the timer event 280 is detected. For example, if the timer interval 250 expires and the trigger event 240 of a son not arriving home is not satisfied, the timer event 280 may be detected and the timer alert 270 communicated to one or more persons. The timer alert 270 may be communicated to the virtual assistant 110 to the user. In addition, the timer alert 270 may be communicated via a message to the user's son. The timer alert 270 may be a natural language alert based on the timer tag 210. In addition, the timer alert 270 may be based on the task prompt 230, the task description 235, and/or the timer instruction 255.

The timer event 280 may be based on one or more of the timer characteristics 275. The timer event 280 may specify the timer characteristics 275 that must be satisfied for the timer event 280 to be detected.

Figure 3C:
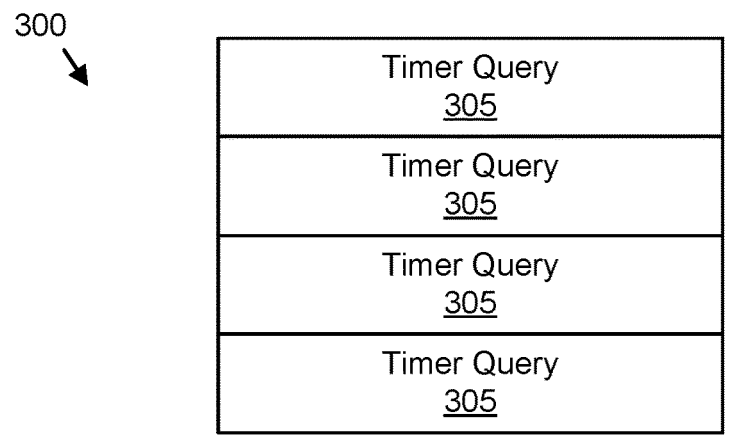
FIG. 3C is a schematic block diagram illustrating one embodiment of a timer query database.

FIG. 3C is a schematic block diagram illustrating one embodiment of a timer query database 300. The timer query database 300 may be organized as a data structure in a memory. The timer query database 300 may reside on the virtual assistant 110, the server 105, or combinations thereof. The timer query database 300 includes a plurality of timer queries 305.

Figure 3D:
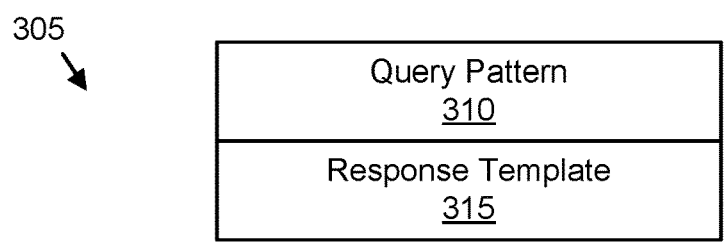
FIG. 3D is a schematic block diagram illustrating one embodiment of a timer query.

FIG. 3D is a schematic block diagram illustrating one embodiment of the timer query 305. Each timer query 305 may define a protocol for querying the virtual assistant 110 about timer data 105. In the depicted embodiment, the timer query 305 includes a query pattern 310 and a response template 315.

The query pattern 310 may provide a natural language pattern for inquiring regarding one of the timer characteristics 275. For example, the query pattern 310 "what action will you take when the timer expires" may inquire as to the automated action 245 associated with timer data 205.

The response template 315 may specify a natural language pattern for responding to the inquiry regarding the timer characteristics 275. For example, the response template 315 "I will turn on the <device>" may be used to report on the automated action 245.

Figure 3E:
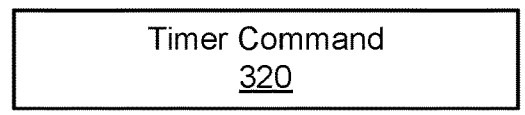
FIG. 3E is a schematic block diagram illustrating one embodiment of a timer command.

FIG. 3E is a schematic block diagram illustrating one embodiment of a timer command 320. The timer command 320 may be parsed from a control signal from the input device 130. In one embodiment, the timer command 320 is converted from speech to text. The text may be parsed for the parts of speech. The timer command 320 may be stored on the virtual assistant 110 and/or the server 105.

Figure 3F:
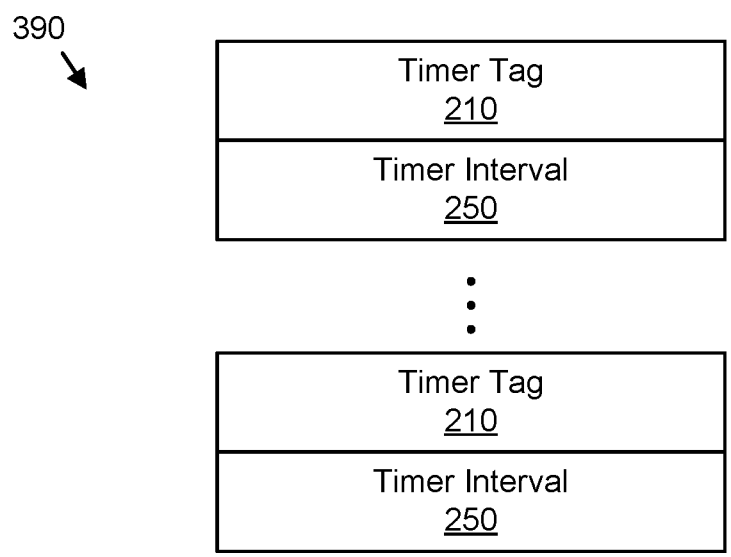
FIG. 3F is a schematic block diagram illustrating one embodiment of a timer report.

FIG. 3F is a schematic block diagram illustrating one embodiment of a timer report 390. The timer report 390 may summarize and report on a plurality of timer data 205. The timer report 390 maybe organized as a data structure in a memory. The timer report 390 may reside on the virtual assistant 110, the server 105, or combinations thereof. In the depicted embodiment, the timer report 390 includes a plurality of timer tag 210 and timer interval 250 pairs. The timer report 390 may be generated in response to a command to report on timers.

Figure 4A:
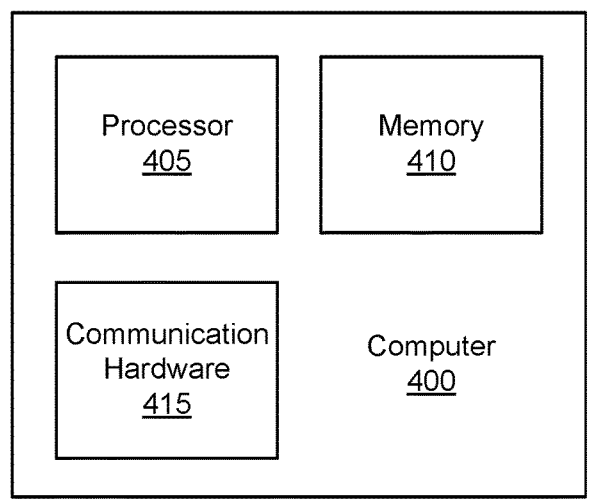
FIG. 4A is a schematic block diagram illustrating one embodiment of a computer.

FIG. 4A is a schematic block diagram illustrating one embodiment of a computer 400. The computer 400 may be embodied in the virtual assistant 110 and/or the server 105. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices such as the network 115 and/or a user.

Figure 4B:
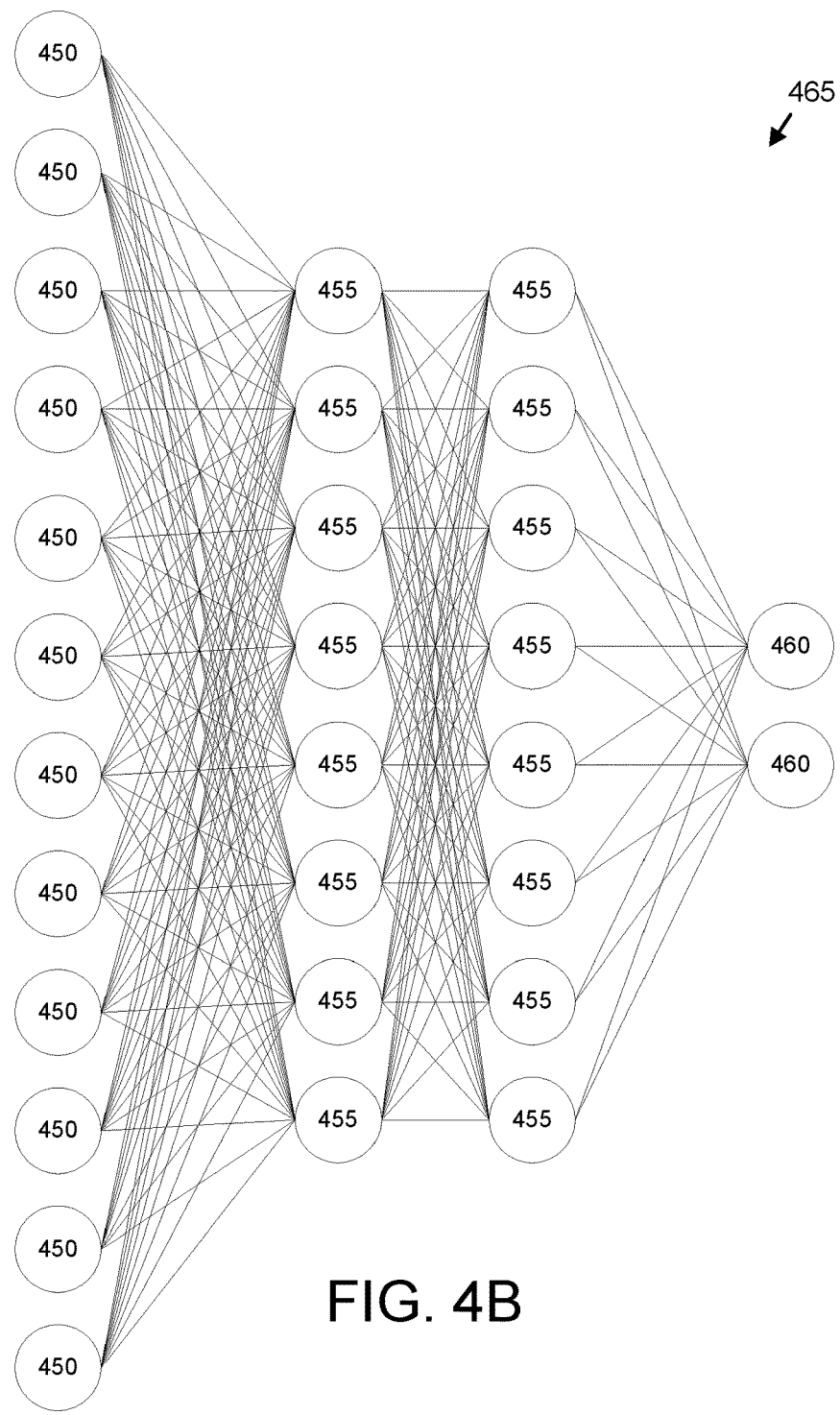
FIG. 4B is a schematic block diagram illustrating one embodiment of a neural network.

FIG. 4B is a schematic block diagram illustrating one embodiment of a neural network 465. The neural network 460 includes a plurality of input nodes 450, a plurality of hidden nodes 455, and a plurality of output nodes 460. The output nodes 460 may represent one or more results and/or predictions. In one embodiment, the output nodes 460 define the timer data 205. In addition, the output nodes 460 may determine with the timer characteristics 275 are satisfied.

Input data may be encoded and presented to the input nodes 450. In one embodiment, the input data may be the timer command 320, timer characteristics 275, and/or the query patterns 310. The hidden nodes 455 and the output nodes 460 may be trained using training data. The training data may comprise timer characteristics 275 and corresponding timer events. In addition, the training data may comprise query patterns 310 and corresponding response templates 315. In one embodiment, the training data includes one or more timer commands 320 and associated timer characteristics 275.

After the neural network 465 is trained, the timer command 320, timer characteristics 275 and/or query patterns 310 may be presented to the input nodes 450 to generate the results and/or conclusions at the output nodes 460.

Figure 5A:
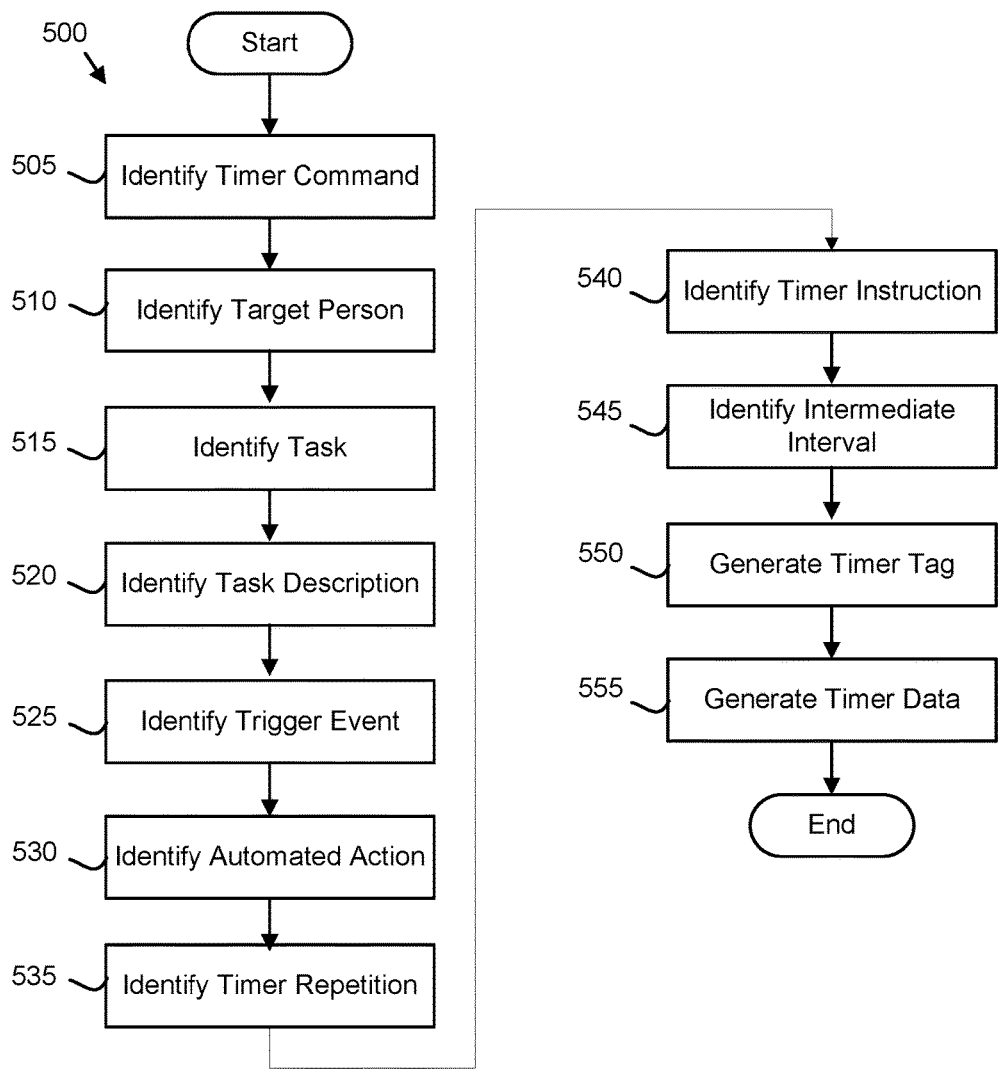
FIG. 5A is a schematic flow chart diagram illustrating one embodiment of a timer data generation method.

FIG. 5A is a schematic flow chart diagram illustrating one embodiment of a timer data generation method 500. The method 500 may generate the timer data 205 for a timer. The method 500 may be performed by the virtual assistant 110, the server 105, and/or the processors 405 thereof.

The method 500 starts, and in one embodiment, the processor 405 identifies 505 a timer command 320 from a command signal from an input device 130. In one embodiment, the timer command 320 is a verbal command received from a microphone input device 130. The verbal command may be converted to text and parsed into parts of speech.

The processor 405 may identify 510 the target person 215. In one embodiment, the target person 215 is identified as an indirect object in the timer command 320. In addition, the target person 215 may be a pronoun and/or proper noun.

The processor 405 may further identify 515 the timer task 225. In one embodiment, the timer task 225 is identified from a verb and/or noun in the timer command 320.

The processor 405 may identify 520 the task description 235. In one embodiment, the processor 405 identifies the task description 235 as phrases that support the timer task 225 in the timer command 320.

The processor 405 may further identify 525 the trigger event 240 from the timer command 320. In addition, the processor 405 may identify 530 the automated action 245 from the timer command 320. The trigger event 240 and/or automated action 245 may be identified by the neural network 465.

In one embodiment, the processor 405 identifies 535 the timer repetitions 220. The timer repetitions 220 may be identified as integer values associated with terms such as "repeat" and/or "times."

The processor 405 may identify 540 the timer instruction 255. The timer instruction 255 may be identified 540 by the neural network 465.

The processor 405 may identify 545 the intermediate interval 260. The intermediate intervals 260 may be identified 545 as time intervals that are less than a timer interval 250.

In one embodiment, the processor 405 generates 550 the timer tag 210. The timer tag 210 may be generated 550 as a summary of the timer characteristics 275.

The processor 405 may generate 555 the timer data 205 and the method 500 ends. The timer data 205 may comprise the timer tag 210 and the timer characteristics 275 including the timer interval 250. In one embodiment, the neural network 465 is trained to generate the timer data 205.

Figure 5B:
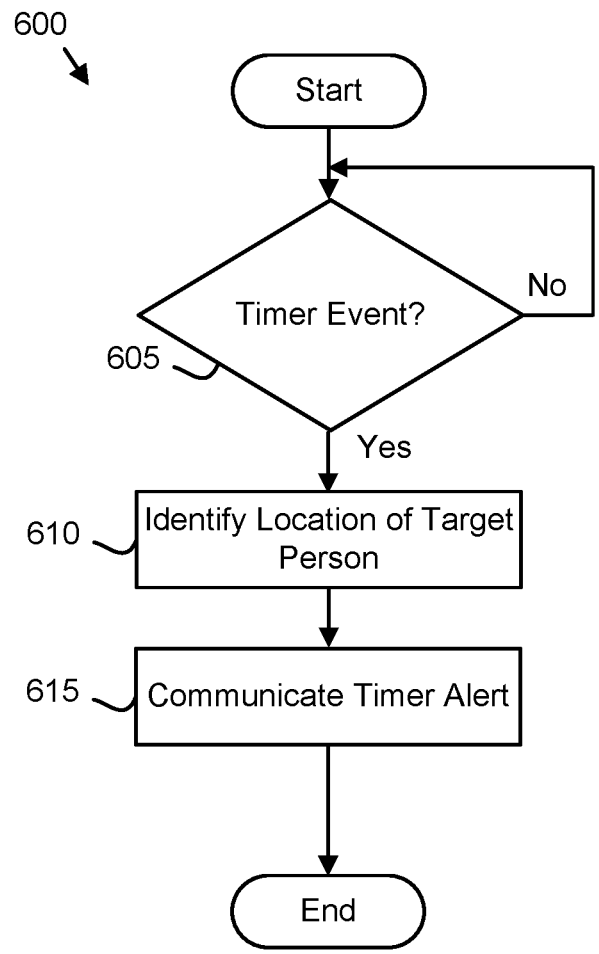
FIG. 5B is a schematic flow chart diagram illustrating one embodiment of a timer alert communication method.

FIG. 5B is a schematic flow chart diagram illustrating one embodiment of a timer alert communication method 600. The method 600 may communicate a timer alert 270 in response to detecting a timer event. The method 600 may be performed by the virtual assistant 110, the server 105, and/or the processors 405 thereof.

The method 600 starts, and in one embodiment, the processor 405 detects 605 the timer event 280. The timer event 280 may be based on the timer interval 250 and one or more of the timer characteristics 275. If the timer interval 250 expires and the one or more specified timer characteristics 275 are satisfied, the processor 405 may detect 605 the timer event 280. If the timer event 280 is not satisfied, the processor 405 continues to monitor to detect 605 the timer event 280.

If the timer event 280 is detected 605, the processor 405 may further identify 610 a location of the target person 215. The location may be retrieved from the target person 215 in the timer data 205. Alternatively, the location may be determined by matching a voice print and/or image from the target person 215 with a person. In addition, the processor 405 may access the link to the tracking data for the person to find a location of the person.

The processor 405 may communicate 615 the timer alert 270 and the method 600 ends. In one embodiment, the timer alert 270 is communicated 615 at the location of the target person 215. The timer alert 270 may be a natural language alert based on the timer tag 210.

Figure 5C:
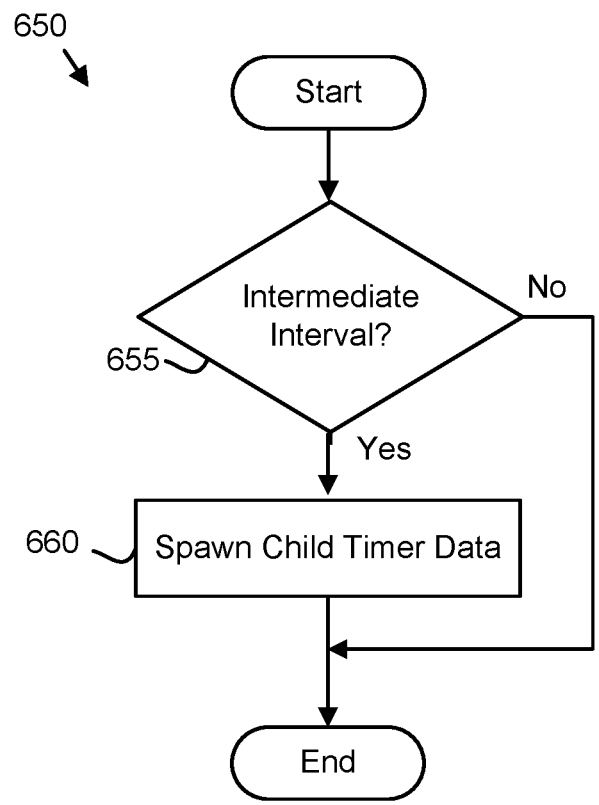
FIG. 5C is a schematic flow chart diagram illustrating one embodiment of a child timer data spawning method.

FIG. 5C is a schematic flow chart diagram illustrating one embodiment of a child timer data spawning method 650. The method 650 may spawn the child timer data 265 for an instance of timer data 205. The method 650 may be performed by the virtual assistant 110, the server 105, and/or the processors 405 thereof.

The processor 405 may detect 655 an intermediate interval 260. In response to detecting the intermediate interval 260, the processor 405 may spawn 660 the child timer data 265 and the method 650 ends. The child timer data 265 may comprise a complete set of the timer data 205. If no intermediate interval 260 is detected 655, the method 650 ends.

Figure 5D:
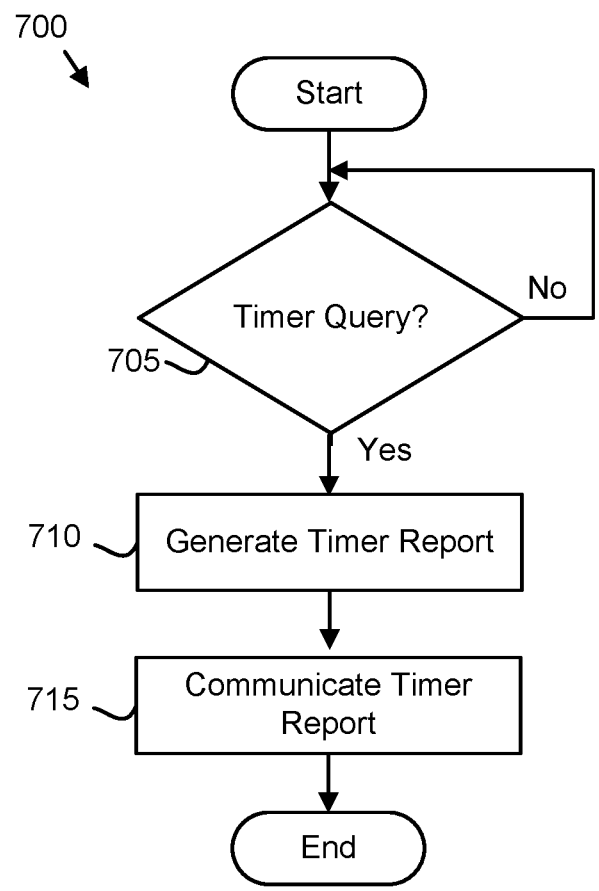
FIG. 5D is a schematic flow chart diagram illustrating one embodiment of a timer report communication method.

FIG. 5D is a schematic flow chart diagram illustrating one embodiment of a timer report communication method 700. The method 700 may communicate the timer report 390. The method 700 may be performed by the virtual assistant 110, the server 105, and/or the processors 405 thereof.

The method 700 starts, and in one embodiment, the processor 405 detects 705 a timer query 305. The processor 405 may receive a timer command 320 and match the timer command 320 to a timer tag 210. In one embodiment, the processor 405 receives a timer command 320 and matches the timer command 320 to a query pattern 310 in a timer query 305. Alternatively, the neural network 465 may detect 705 the timer query 305. If no timer query 305 is detected, the processor 405 may continue to monitor for the timer query 305.

If the timer query 305 is detected 705, the processor 405 generate 710 the timer report 390. In one embodiment, the timer report 390 is generated as the timer tag 210 and timer interval 250 for each active instance of timer data 205. In addition, the timer report 310 may comprise the response template 315 corresponding to the query pattern 310. In a certain embodiment, the neural network 465 generates the timer report 390.

The processor 405 may communicate 715 the timer report 390 to the user and the method 700 ends. In one embodiment, the timer report 390 is communicated 715 verbally through an audible signal. Alternatively, the processor 405 may be communicated 715 through a message to an address specified by contact information for the user.

Figure 5E:
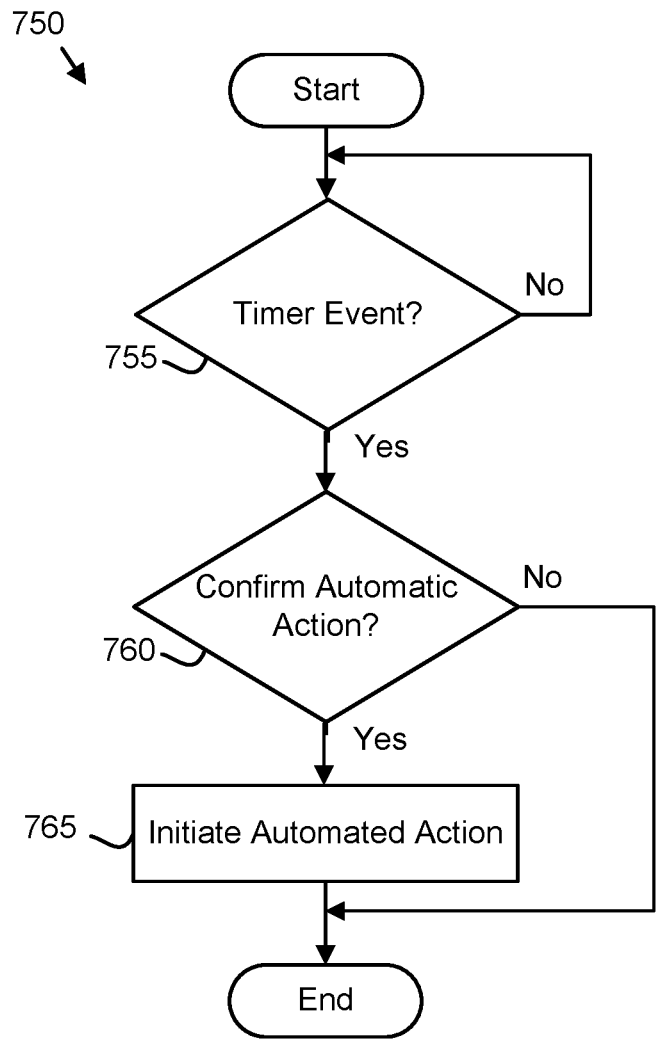
FIG. 5E is a schematic flow chart diagram illustrating one embodiment of an automated action initiation method.

FIG. 5E is a schematic flow chart diagram illustrating one embodiment of an automated action initiation method 750. The method 750 may initiate the automated action 245. The method 750 may be performed by the virtual assistant 110, the server 105, and/or the processors 405 thereof.

The method 750 starts, and in one embodiment, the processor 405 detects 755 the timer event 280. The timer event 280 may be detected 755 is described in step 605 of FIG. 5B. In one embodiment, the timer event 280 specifies the automated action 245. If the timer event 280 is not detected 755, the processor 405 may continue to monitor for the timer event 280.

If the timer event 280 is detected 755, the processor 405 may confirm 760 that the automated action 245 is to be performed. In one embodiment, the processor 405 prompts the user and receives a confirmation from the user. If no confirmation is received, the method 750 ends.

If the confirmation is received and/or if no confirmation is required, the processor 405 may initiate 765 the automated action 245 and the method 750 ends. The automated action 245 may be starting an oven, lowering the thermostat, unlocking the door, and the like.

The embodiments identify the timer command 320 from the command signal of the input device 130 and identify the timer interval 250 and the timer characteristics 275 from the timer command 320. The embodiments may further generate the timer data 205 with the timer tag 210. The timer tag 210 provides a natural language reference to the timer data 205, allowing the timer data 205 to be easily referred to in subsequent timer commands 320.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an input device;
a processor;
a memory that stores code executable by the processor to:
identify a timer command from a command signal from a user through the input device;
identify a timer interval and timer characteristics of a timer from the timer command;
generate a timer tag for the timer from the timer interval and the timer characteristics, wherein the timer tag is a natural language description of the timer characteristics;
generate a timer alert from the timer tag using a neural network trained on query patterns and response templates, wherein each query pattern is a natural language pattern for inquiring regarding the timer characteristics and has a corresponding response template for responding to the query pattern and reporting on an automated action for the query pattern;
detect the timer interval expiring; and
in response to the timer interval expiring, communicate the timer alert.

2. The apparatus of claim 1, wherein the code is further executable by the processor to detect a timer event based on one or more of the timer characteristics being satisfied and the timer interval expiring, the one or more timer characteristics comprising a target person, a task, a task description, a trigger event, an automated action, a timer repetition, a timer instruction, and an intermediate interval from the timer command, wherein the timer event must occur before the timer is complete.

3. The apparatus of claim 2, wherein the code is further executable by the processor to identify a location of the target person and wherein the timer alert is communicated at the location.

4. The apparatus of claim 2, wherein the timer alert is a natural language alert based on the timer tag.

5. The apparatus of claim 2, wherein the code is further executable by the processor to spawn child timer data in response to the intermediate interval.

6. The apparatus of claim 2, wherein the code is further executable by the processor to:
   detect a timer query; and
   in response to detecting the timer query, communicate a timer report.

7. The apparatus of claim 2, wherein the code is further executable by the processor to initiate the automated action in response to detecting the timer event.

8. A method comprising:
   identifying, by use of a processor, a timer command from a command signal from a user through an input device;
   identifying a timer interval and timer characteristics of a timer from the timer command;
   generating a timer tag for the timer from the timer interval and the timer characteristics, wherein the timer tag is a natural language description of the timer characteristics;
   generating a timer alert from the timer tag using a neural network trained on query patterns and response templates, wherein each query pattern is a natural language pattern for inquiring regarding the timer characteristics and has a corresponding response template for responding to the query pattern and reporting on an automated action for the query pattern;
   detecting the timer interval expiring; and
   in response to the timer interval expiring, communicating the timer alert.

9. The method of claim 8, the method further comprising detecting a timer event based on one or more of the timer characteristics being satisfied and the timer interval expiring, the one or more timer characteristics comprising a target person, a task, a task description, an intermediate trigger event, an automated action, a timer repetition, a timer instruction, and a timer interval from the timer command, wherein the timer event must occur before the timer is complete.

10. The method of claim 9, the method further comprising identifying a location of the target person and wherein the timer alert is communicated at the location.

11. The method of claim 9, wherein the timer alert is a natural language alert based on the timer tag.

12. The method of claim 9, the method further comprising spawning child timer data in response to the intermediate interval.

13. The method of claim 9, the method further comprising:
   detecting a timer query; and
   in response to detecting the timer query, communicating a timer report.

14. The method of claim 9, the method further comprising initiating the automated action in response to detecting the timer event.

15. A program product comprising a non-transitory computer readable storage medium that stores code executable by a processor, the executable code comprising code to:
   identify a timer command from a command signal from a user through an input device;
   identify a timer interval and timer characteristics of a timer from the timer command;
   generate a timer tag for the timer from the timer interval and the timer characteristics, wherein the timer tag is a natural language description of the timer characteristics;
   generate a timer alert from the timer tag using a neural network trained on query patterns and response templates, wherein each query pattern is a natural language pattern for inquiring regarding the timer characteristics and has a corresponding response template for responding to the query pattern and reporting on an automated action for the query pattern;
   detect the timer interval expiring; and
   in response to the timer interval expiring, communicate the timer alert.

16. The program product of claim 15, the code further detecting a timer event based on one or more of the timer characteristics being satisfied and the timer interval expiring, the one or more timer characteristics comprising a target person, a task, a task description, a trigger event, an automated action, a timer repetition, a timer instruction, and an intermediate interval from the timer command, wherein the timer event must occur before the timer is complete.

17. The program product of claim 16, the code further identifying a location of the target person and wherein the timer alert is communicated at the location.

18. The program product of claim 16, wherein the timer alert is a natural language alert based on the timer tag.

19. The program product of claim 16, the code further spawning child timer data in response to the intermediate interval.

20. The program product of claim 16, the code further:
   detecting a timer query; and
   in response to detecting the timer query, communicating a timer report.

* * * * *